United States Patent
Jee

(10) Patent No.: US 11,518,457 B2
(45) Date of Patent: Dec. 6, 2022

(54) VEHICLE TRACK

(71) Applicant: SRJ, Inc., Schaumburg, IL (US)

(72) Inventor: Woo Young Jee, Inverness, IL (US)

(73) Assignee: SRI, Inc., Schaumburg, IL (US)

( * ) Notice: Subject to any disclaimer, the term of this patent is extended or adjusted under 35 U.S.C. 154(b) by 931 days.

(21) Appl. No.: 16/358,945

(22) Filed: Mar. 20, 2019

(65) Prior Publication Data

US 2020/0298919 A1    Sep. 24, 2020

(51) Int. Cl.
*B62D 55/24* (2006.01)
*B62D 55/20* (2006.01)
*B62D 55/06* (2006.01)

(52) U.S. Cl.
CPC .......... *B62D 55/244* (2013.01); *B62D 55/06* (2013.01); *B62D 55/20* (2013.01)

(58) Field of Classification Search
CPC ....... B62D 55/244; B62D 55/06; B62D 55/20
See application file for complete search history.

(56) References Cited

U.S. PATENT DOCUMENTS

| | | |
|---|---|---|
| 1,773,534 A | 8/1930 | Kegresse |
| 5,131,728 A | 7/1992 | Katoh et al. |
| 5,295,741 A | 3/1994 | Togashi et al. |
| 5,320,585 A | 6/1994 | Kato |
| 5,368,376 A | 11/1994 | Edwards et al. |
| 5,380,076 A | 1/1995 | Hori |
| 5,403,643 A | 4/1995 | Tsuru |
| 5,536,464 A | 7/1996 | Muramatsu |
| 5,813,733 A | 9/1998 | Hori et al. |
| 6,129,426 A | 10/2000 | Tucker |
| 6,352,320 B1 | 3/2002 | Bonko et al. |
| 8,083,297 B2 | 12/2011 | Fujita |
| 9,511,805 B2 | 12/2016 | Lajoie et al. |

(Continued)

FOREIGN PATENT DOCUMENTS

| | | | |
|---|---|---|---|
| EP | 0304390 A2 | 2/1989 | |
| JP | 2018535885 A | 12/2018 | |
| WO | WO-9000488 A * | 1/1990 | ........... B62D 55/202 |

(Continued)

OTHER PUBLICATIONS

International Search Report and Written Opinion of International Application No. PCT/US2020/022268, dated Jul. 2, 2020, 11 pp.

(Continued)

*Primary Examiner* — Kip T Kotter
(74) *Attorney, Agent, or Firm* — Shumaker & Sieffert, P.A.

(57) ABSTRACT

An endless track for a tracked vehicle includes a track body and a plurality of cores at least partially embedded the track body, each core having at least one roller surface configured to contact an outer flange of a track roller when the track roller is engaged with an inner surface of the track body, and at least one protrusion configured to contact an inner flange of the track roller when the track roller is engaged with the inner surface of the track body. The track roller is configured to simultaneously contact a first core and an adjacent second core. A distance between the first core and the second core is selected such that about 0.2% of a flange diameter of the track roller extends perpendicular to an axis between a first contact point on the first core and a second contact point on the second core.

20 Claims, 8 Drawing Sheets

(56) References Cited

U.S. PATENT DOCUMENTS

2015/0344087 A1  12/2015  de Boe et al.
2017/0361884 A1  12/2017  Jee

FOREIGN PATENT DOCUMENTS

| WO | WO-9202399 A   * | 2/1992 | ........... B62D 55/244 |
|----|------------------|--------|-------------------------|
| WO | WO-2011093413 A1 * | 8/2011 | ........... B62D 55/244 |
| WO | 2014/138931 A1   | 9/2014 | |
| WO | 2017093908 A1    | 6/2017 | |

OTHER PUBLICATIONS

International Preliminary Report on Patentability from International Application No. PCT /US2020/022268, dated Sep. 30, 2021, 9 pp.

\* cited by examiner

VEHICLE TRACK

TECHNICAL FIELD

The disclosure relates to tracked vehicles.

BACKGROUND

Many off-road vehicles, such as earthmoving vehicles (e.g., excavators, skid steer track loaders, and multi-terrain track loaders), agricultural vehicles, and military vehicles include an endless track and a plurality of rollers. An endless track may help provide traction on ground surfaces that traditional wheels having a circular cross-section may not be able to adequately grip. For example, a vehicle with an endless track may bridge a greater surface area than a vehicle with two or more circular wheels, which may help the vehicle with the endless track traverse surfaces that the vehicle with circular wheels would not ordinarily be able to traverse, such as uneven or loose surfaces (e.g., gravel or mud).

In some cases, a vehicle track is formed of metal, an elastomer, rubber, such as a molded rubber, or a combination of metal and rubber. The vehicle track may be molded as a single, integral piece or an assembly of interconnected parts that are coupled together to define a vehicle track. Some vehicle tracks include a track body with a first, interior side that is configured to engage with a drive system, and a second, exterior side that includes multiple protrusions (e.g., "traction lugs" or "tread lugs") extending from one or more common surfaces and defining a tread pattern. In some examples, the vehicle track may include a plurality of cores at least partially embedded within the track body. The cores may define a portion of a shape of the vehicle track, engage with a drive system, or the like.

SUMMARY

The present disclosure describes example vehicle tracks for a tracked vehicle. In some examples, a vehicle track includes a track body having an outer surface configured to engage with a ground surface, and an inner surface configured to engage with a plurality of track rollers. The track body includes a plurality of cores in close proximity to one another so as to provide a near-continuous rigid roller surface along which the track rollers may roll. The cores define the near continuous roller surface while still being separated from one another in a longitudinal direction (e.g., not overlapping in the longitudinal direction), which may increase the flexibility of the track body. In some examples, the plurality of cores may be spaced apart from one another at a distance such that, when a track roller simultaneously contacts any two adjacent cores, approximately 0.2% of the diameter of the track roller extends past its contact points with the cores and into the space between the cores.

For example, a track roller may be configured to simultaneously contact a first core and an adjacent second core of the plurality of cores, and a distance between the first core and the second core can be selected such that when a portion of the track body is substantially flat, at least one of: 1) about 0.2% of an inner flange diameter of an inner flange of the track roller extends perpendicular to a first axis extending between a first inner flange contact point on a first protrusion of the first core and a second inner flange contact point on a second protrusion of the second core, or 2) about 0.2% of an outer flange diameter of the outer diameter of the track roller extends perpendicular to a second axis extending between a first outer flange contact point on a first rolling surface of the first core and a second outer flange contact point on a second rolling surface of the second core.

The details of one or more examples of the disclosure are set forth in the accompanying drawings and the description below. Other features, objects, and advantages of the disclosure will be apparent from the description and drawings, and from the claims.

DETAILED DESCRIPTION

In examples described herein, a vehicle track includes a track body and a plurality of cores, which may be at least partially embedded in the track body (e.g., fully or partially surrounded by the track body). The track body is configured to engage with a drive system of a vehicle and engage with a ground surface in order to move a vehicle mounted to the vehicle track. The track can be, for example, an endless track. The cores are configured to stabilize the track body, maintain a shape of the track body, strengthen the track body, define one or more structures of the track body that are configured to engage with a vehicle drive system, and/or reduce stress experienced by the track body during use of the track body on a vehicle. The cores may be in relative proximity to one another within the track body so as to help define a near continuous rigid roller surface along which a plurality of track rollers of a vehicle drive system may roll in a longitudinal direction, while also being separated from one another in the longitudinal direction so as to enable the track body to be relatively flexible. In some examples herein, at least two adjacent cores of a plurality of cores of a track body are separated from one another by a distance such that, when a track roller simultaneously contacts the adjacent cores, approximately 0.2% of a diameter of the track roller extends past its contact points with the cores and into the space between the cores.

Figure 1A:
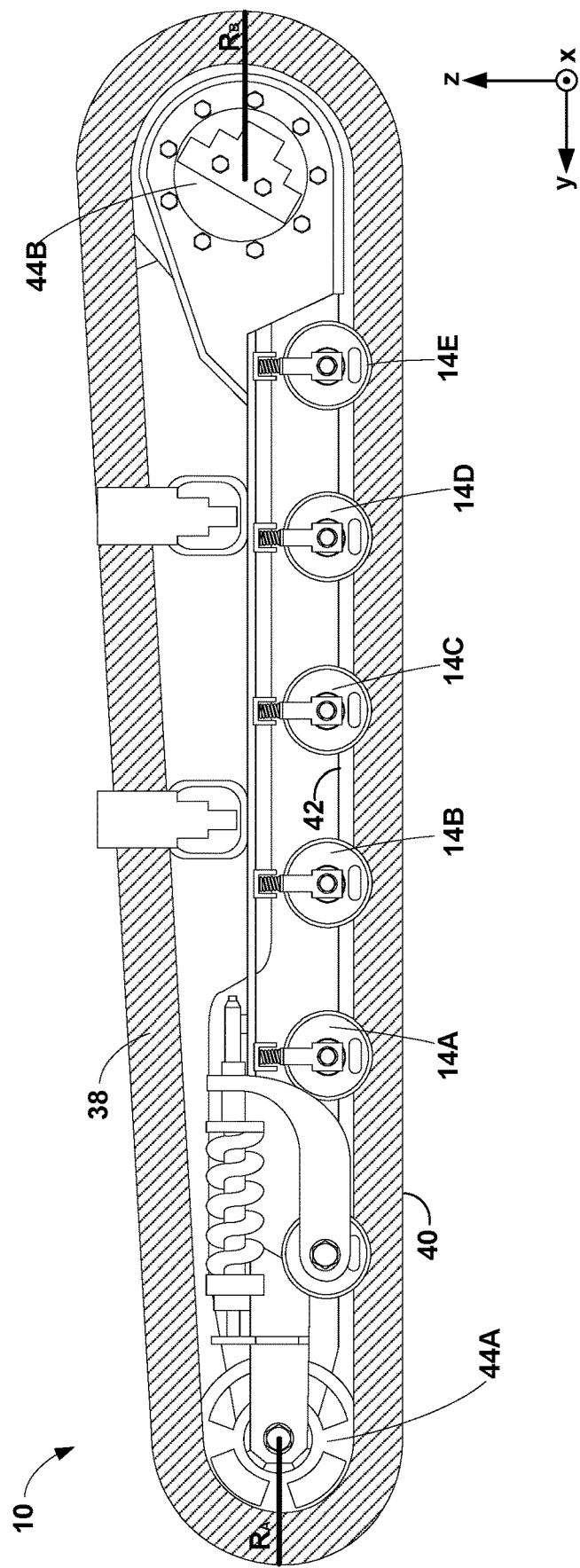
FIG. 1A is a side view of an endless track assembly.

FIG. 1A is a side view of an example endless track assembly. The endless track assembly includes endless track 10 and a plurality of track rollers 14A-14E (collectively, track rollers 14 or generally individually referred to as a track roller 14) disposed within an interior region defined by track 10. Endless track 10 includes track body 38 defining an exterior track surface 40 and an interior track surface 42. Exterior track surface 40 may be configured to contact a ground surface. Interior track surface 42 may be configured to contact track rollers 14.

Endless track 10 is configured to enable a vehicle to travel over an uneven or low-traction surface. Endless track 10 (also commonly referred to as a "continuous track" or "caterpillar track") may help provide traction on surfaces that traditional wheels having a circular cross-section may not alone be able to adequately grip. For example, a vehicle with an endless track may bridge a greater surface area than a vehicle with two or more circular wheels, which may help the vehicle with the endless track traverse surfaces that the vehicle with circular wheels would not ordinarily be able to traverse, such as uneven or loose surfaces (e.g., gravel or mud). In some examples, endless track 10 may be formed of metal, rubber, such as a molded rubber, or a combination of metal and rubber. Endless track 10 may be molded as a single, integral piece or may be an assembly of interconnected parts that are coupled together to define an endless track. In some examples, endless track 10 is a relatively small-pitch track, for example, a 48-millimeter-pitch track or a 52.5-millimeter-pitch track.

Track roller 14 may be configured to contact and roll along interior track surface 42 of endless track 10 (in a longitudinal direction, for example, along the y-axis direction as depicted in FIG. 1A, where orthogonal x-y-z axes are shown in the figures to aid the description of the figures) when track 10 is driven by a drive system, which may engage with track 10 using any suitable technique, such as via drive sprocket wheels 44A, 44B. Track rollers 14 may be configured to distribute the weight of a vehicle or machine along interior track surface 42 of track body 38. Track roller 14 may also engage with interior track surface 42 of endless track 10 to keep track 10 aligned with respect to a machine or vehicle connected to track rollers 14.

Track rollers 14 may be formed from any suitable material. In some examples, each track roller 14 may be made of metal or any other durable material. In some cases, track roller 14 is formed of metal, rubber, such as a molded rubber, or a combination of metal and rubber. Track roller 14 may be molded as a single, integral piece or an assembly of interconnected parts that are coupled together to define a roller.

Figure 1B:
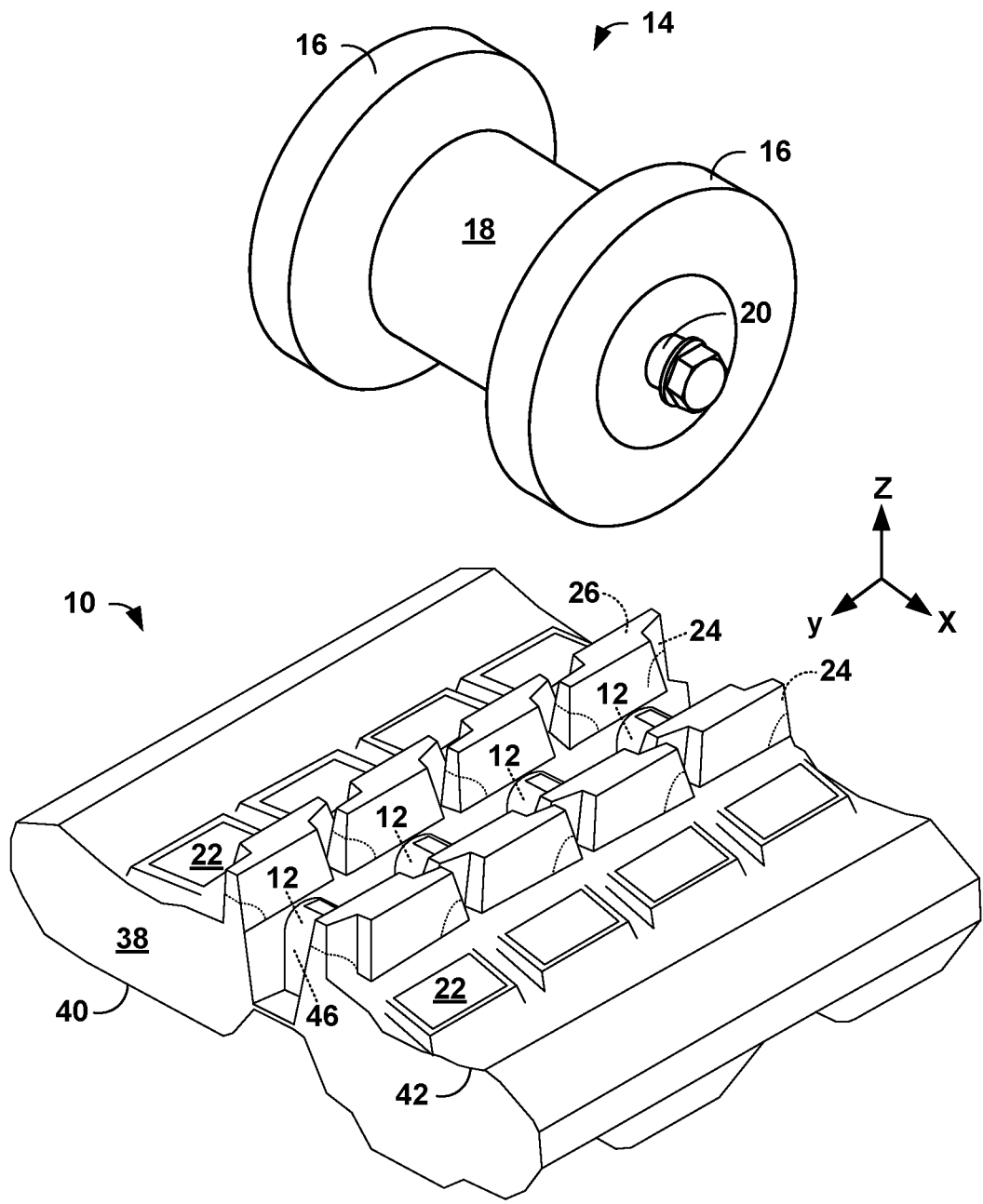
FIG. 1B is an exploded perspective view of a section of the endless track assembly of FIG. 1A.
Figure 1C:
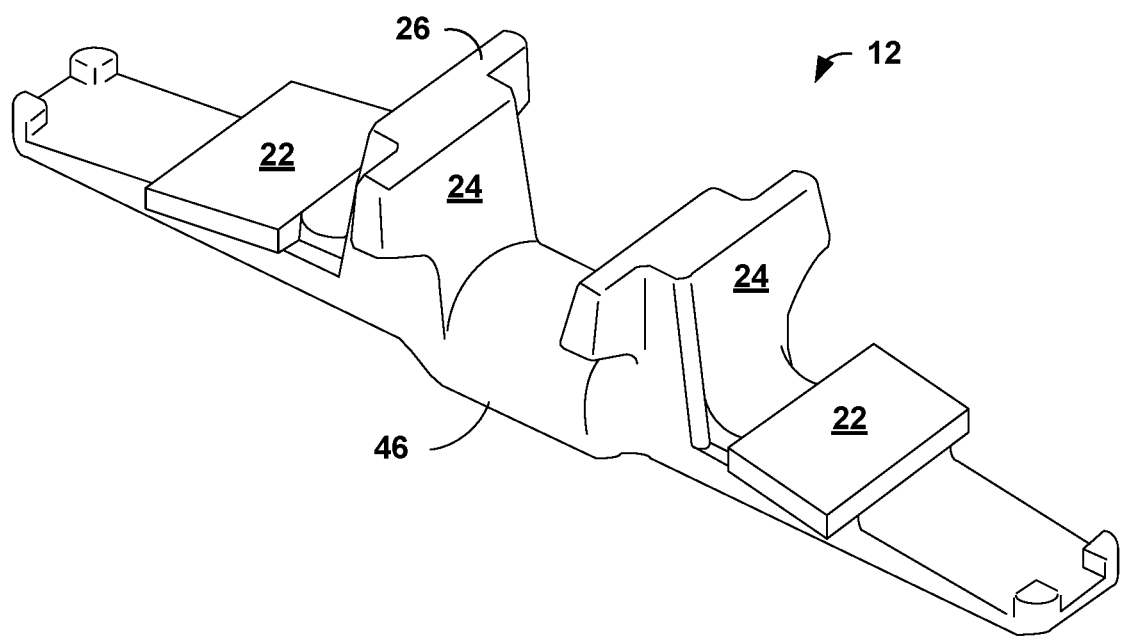
FIG. 1C is a perspective view of an example core of the endless track of FIG. 1A.

FIG. 1B is an exploded perspective view of a section of endless track 10 and track roller 14, and FIG. 1C illustrates an example core 12. Track roller 14 may include one or more circular flanges extending radially from a common axis, such as central axle 20. In the example shown in FIG. 1B, track roller 14 includes a central inner flange 18 disposed between two larger, outer flanges 16. Inner flange 18 may be rigidly connected to outer flanges 16, such that all three flanges are configured to rotate simultaneously around their common axle 20. In some examples, inner flange 18 and outer flanges 16 may be monolithically constructed from a single piece of material. In other examples, inner flange 18 and outer flanges 16 may be constructed as separated components and then connected (e.g., welded, fused, etc.) together.

Track 10 and track roller 14 may be configured to maintain alignment of the track 10 with respect to the roller 14 and the vehicle as track roller 14 rolls along interior track surface 42. For example, endless track 10 may include a plurality of cores 12 (an example core is shown in detail in FIG. 1C), which may be at least partially embedded within interior track surface 42 of the track. For example, cores 12 may be fully or partially surrounded by track body 38, e.g., encased in the material forming track body 38, and may be attached to the material forming track body 38 or may be enclosed within a pocket formed by track body 38. Cores 12 may be partially or fully embedded within track body 38 near interior track surface 42, such that the structure of cores 12 defines the shape of interior track surface 42.

Cores 12 may be made of any suitable material. In some examples, cores 12 are formed from a metal, such as steel, iron, or another metal, or a plurality of materials that include metal. In some such examples, each core 12 may be formed from a single, continuous piece of metal. For example, cores 12 may be manufactured by hot forging, using metal rods, or cast from metal. In other examples, cores 12 may be formed from two or more sections and attached together to form core 12. In some examples, the two sections may be attached or otherwise integrated into a single core 12.

Each core 12 may include base member 46 (FIG. 1C). Base member 46 may include an elongated structure, for example, having a rectangular shape. Base member 46 may be partially or fully embedded within track body 38, so as to rigidly retain the position of core 12 with respect to track body 38. In some examples, base member 46 may be oriented perpendicularly to the longitudinal axis of track 10 (e.g., base member 46 may be substantially aligned in the x-axis direction, as depicted in FIG. 1A).

Each core 12 may include one or more protrusions 24 extending perpendicularly from base member 46, such that, when base member 46 is embedded within endless track 10, protrusions 24 extend in the z-axis direction. Protrusions 24 may be configured to engage with and guide track roller 14, e.g., enabling track roller 14 and track 10 to roll relative to each other along a longitudinal axis (e.g., the y-axis depicted in FIG. 1B) of track 10, but preventing track roller 14 from moving laterally or perpendicularly to the longitudinal axis (e.g., the x-axis depicted in FIG. 1B). For example, protrusions 24 may be configured to fit between outer flanges 16 of track roller 14, such that any lateral motion of roller 14 in the x-axis direction would be prevented by contact between protrusions 24 and an interior surface of outer flanges 16.

In some examples, protrusions 24 may have a Z-shaped or lightning-bolt-shaped top surface 26 (also referred to as inner roller surface 26, described further below), as seen from an overhead perspective (e.g., a surface in the x-y plane or a projection of the surface onto the x-y plane). A Z-shaped protrusion 24 may be advantageous in that, when endless track 10 bends or curves near the front and back ends of the track, any two adjacent protrusions 24 may tend to nest within one another rather than physically contact each other, which could otherwise prevent endless track 10 from bending any further (thereby reducing its flexibility) and potentially disrupting the mechanical connection between track body 38 and cores 12.

In some examples, each core 12 may include one or more outer roller surfaces 22. In some examples, outer roller surfaces 22 may be fully embedded within track body 38, e.g., a portion of track body 38 may separate outer roller surfaces 22 from roller 14. In other examples, such as the example depicted in FIG. 1B, outer roller surfaces 22 may be exposed and directly contact roller 14 as roller 14 rolls along outer roller surfaces 22. Outer roller surfaces 22 may include a rigid surface configured to contact an outer perimeter (e.g., circumference in the case of a circular cross-section) of outer flange 16. Track roller 14, via outer flange 16, may be configured to roll forward and/or backward (i.e., in the y-axis direction) along the surface (e.g., along the x-y plane) defined by a series of outer roller surfaces 22 of adjacent cores 12. Adjacent cores 12 may be spaced apart from one another in a longitudinal direction along the y-axis such that, as outer flanges 16 of track roller 14 roll along outer roller surfaces 22, outer flange 16 experiences a substantially smooth transition from one outer roller surface 22 to the next. In other words, adjacent outer roller surfaces 22 may be spaced sufficiently close together such that a significant portion of outer flange 16 does not fall down into the longitudinal gap between the adjacent cores 12, which may cause jostling of the vehicle and a bumpy ride to the occupants inside the vehicles.

Similarly, in some examples, but not all examples, the Z-shaped top surface 26 of protrusions 24 may be configured as inner roller surfaces 26. For example, track roller 14, via inner flange 18, may be configured to roll forward and/or backward (i.e., in the y-axis direction) along the surface (e.g., along the x-y plane) defined by a series of inner roller surfaces 26 of protrusions 24 of adjacent cores 12 (though rubber or other track body 38 material may be present between core 12 and track roller 14). Adjacent cores 12 may be spaced apart from one another in a longitudinal direction along the y-axis such that, as inner flange 18 of track roller 14 rolls along inner roller surfaces 26, inner flange 18 experiences a substantially smooth transition from one inner roller surface 26 to the next. In other words, adjacent inner roller surfaces 26 may be spaced sufficiently close together such that a significant portion of inner flange 18 does not fall down into the longitudinal gap between the adjacent cores 12, which may cause jostling of the vehicle and a bumpy ride to the occupants inside the vehicles.

However, if (immediately) adjacent cores 12 are spaced too closely together, then the core spacing may not provide sufficient room for endless track 10 to bend without adjacent cores 12 contacting each other, preventing track 10 from bending any further, potentially disrupting the connection between the cores 12 and track 10, and/or resulting in a more rigid track. For example, as track 10 bends around drive sprocket wheels 44A, 44B and/or track rollers 14 near the front and back ends of track 10, the bend in track 10 defines a radius of curvature (e.g., radii RA, RB in FIG. 1A). Cores 12 that are too closely spaced together, e.g., configured to overlap in the y-axis direction when the portion of track 10 (including the cores 12) is flat, may result in a more rigid track that defines a larger radius of curvature that is unable to engage with drive sprocket wheels 44A, 44B or track rollers 14 that have a radius smaller than the track's radius of curvature. The inability to bend may be particularly pronounced with relatively small pitch tracks, such as a 48-millimeter-pitch track or a 52.5-millimeter-pitch track. The spacing of cores 12 as described herein helps to balance a smooth ride for the vehicle's occupants with the flexibility of the track.

Figure 2:
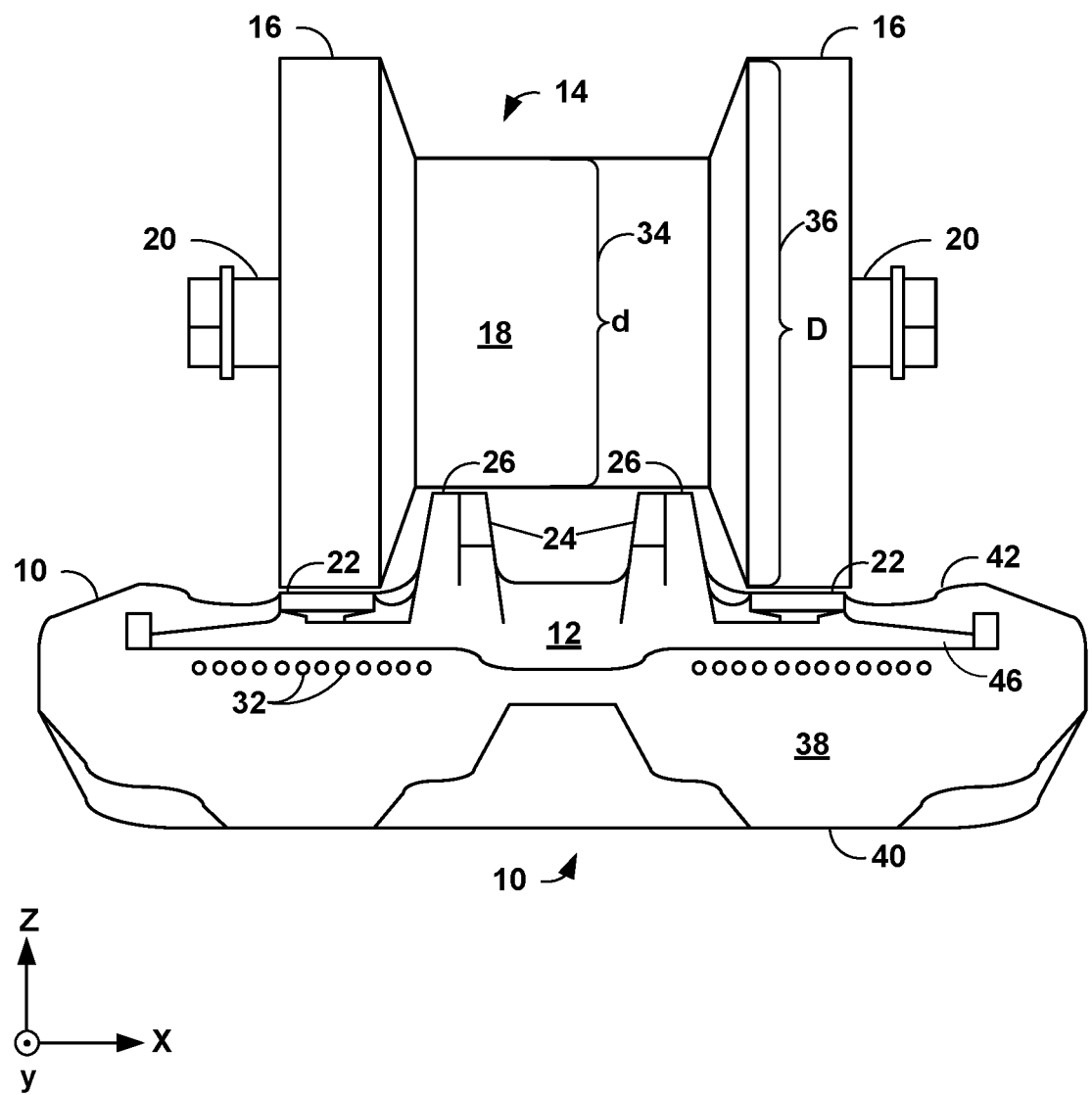
FIG. 2 is a schematic cross-sectional view of the endless track and the track roller of FIG. 1B.

FIG. 2 is a cross-sectional view of endless track 10 and track roller 14 of FIG. 1B. FIG. 2 further depicts core 12 of FIG. 1C at least partially embedded within track body 38. As shown in FIG. 2, in some examples, endless track 10 may include metal wires or cords 32 embedded within track body 38 and extending in a longitudinal direction (the y-axis direction). Metal wires or cords 32 are configured to provide support to track body 38 to help increase the durability of endless track 10.

In some cases, track roller 14 may be configured to contact interior track surface 42 of track 10 and roll along interior track surface 42 (e.g., track 10 may rotate relative to track roller 14 as track roller 14 is held stationary relative to a vehicle or machine body). Track roller 14 may include one or more circular flanges 16, 18 extending radially from a common central axle 20. For example, track roller 14 may include a central inner flange 18, having an inner flange diameter "d" 34 and two larger, outer flanges 16, each outer flange 16 having an outer flange diameter "D" 36. Inner flange 18 may be rigidly connected to outer flanges 16, such that all three flanges are configured to rotate simultaneously around their common axle 20.

In some examples, outer flanges 16 may contact and roll along a surface of track 10 defined by the plurality of outer roller surfaces 22 and, for example, in the x-y plane. In some examples, inner flange 18 may contact and roll along a surface of track 10 that is defined by inner roller surfaces 26, for example, in the x-y plane. In some cases, inner flange 18 may only contact inner roller surfaces 26 when track roller 14 is directly between two adjacent cores 12, such that track roller 14 drops slightly downward in the negative-z-axis direction.

Figure 3:
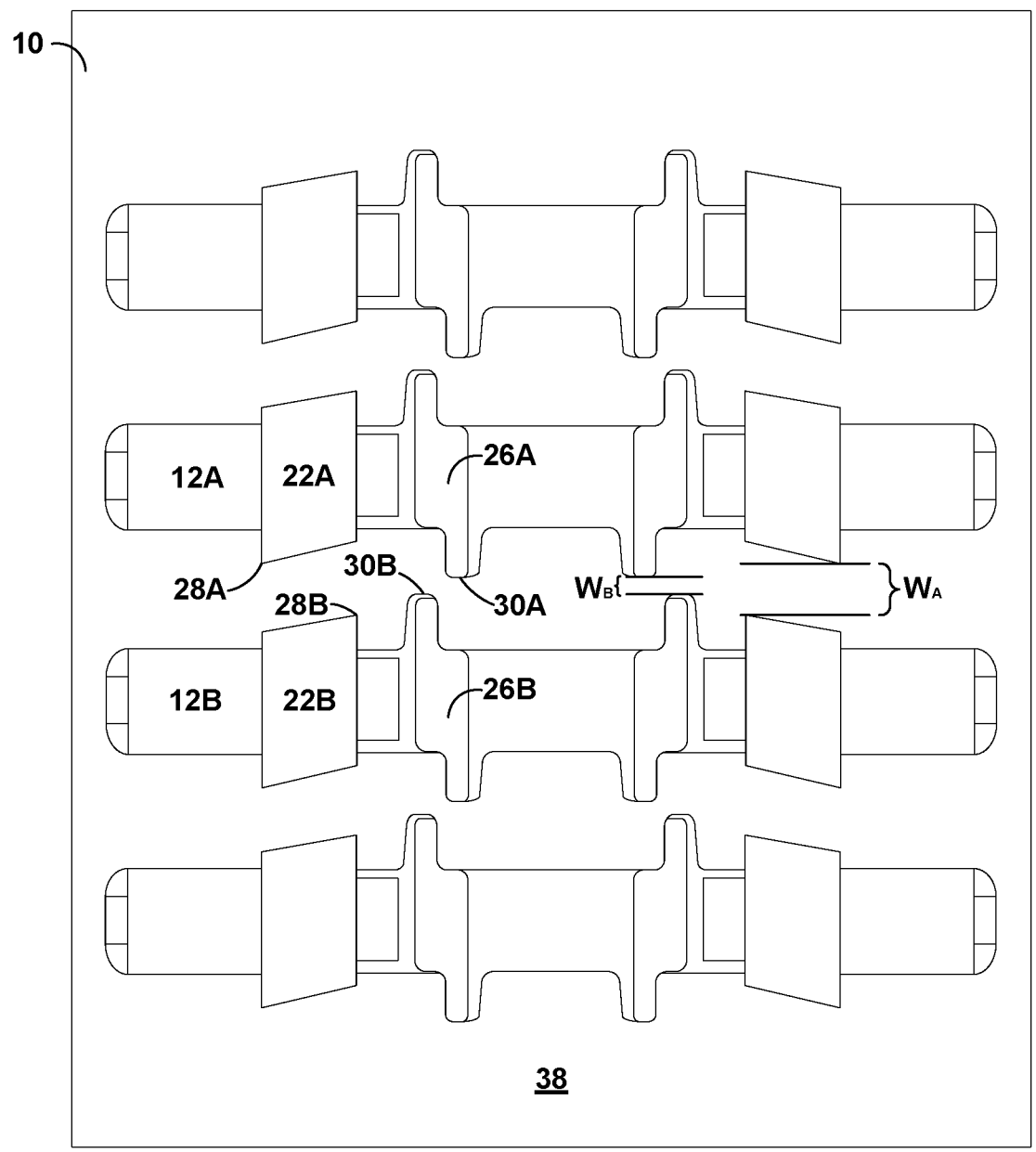
FIG. 3 is an overhead view of a section of the endless track of FIGS. 1A and 1B.

FIG. 3 is a top view of a section of endless track 10. When cores 12 are positioned or embedded within track body 38, cores 12 are separated from each other in a longitudinal direction (e.g., the y-axis direction in the orthogonal x-y axes shown in FIG. 3) by a distance that enables outer roller surfaces 22A and 22B of adjacent cores 12A and 12B to define a substantially flat rolling surface for outer flange 16 of track roller 14. Adjacent outer roller surfaces 22 (e.g., outer roller surfaces 22A and 22B in FIG. 3) of immediately adjacent cores 12 (shown as 12A and 12B in FIG. 3) may define a separation distance or gap width "$W_A$" between them, which is measured in the y-axis direction. The gap width $W_A$ may be measured, for example, between the two closest points of the portion of adjacent cores 12 defining outer roller surfaces 22 in the y-axis direction. As outer flange 16 of track roller 14 rolls from outer roller surface 22A to an adjacent outer roller surface 22B, a portion of outer flange 16 may drop down into the gap between first outer contact point 28A and second outer contact point 28B.

Protrusions 24 of cores 12 each define a respective inner roller surface 26. Adjacent inner roller surfaces 26 (e.g., inner roller surfaces 26A and 26B in FIG. 3) may define a separation distance or gap width "$W_B$" between them, which is measured in the y-axis direction. The gap width $W_B$ may be measured, for example, between the two closest points of the portion of adjacent cores 12 that define inner roller surfaces 26 in the y-axis direction. As inner flange 18 of track roller 14 rolls from inner roller surface 26A to inner roller surface 26B, a portion of the inner flange 18 may drop down into the gap between first inner contact point 30A and second inner contact point 30B.

In some other track designs, adjacent cores 12 may be spaced such that the widths $W_A$ and/or $W_B$ may be zero. In other words, outer contact point 28A may be longitudinally aligned (in the y-axis direction) with outer contact point 28B, or in some cases, the two contact points 28A, 28B may "overlap" in the y-axis direction. In these cases, outer flange 16 of track roller 14 experiences continuous physical contact with adjacent outer roller surfaces 22—i.e., the flange will not "drop down" between two adjacent outer roller surfaces 22. Similarly, inner contact point 30A may be longitudinally aligned with inner contact point 30B, or in some cases, the two contact points 30A, 30B may "overlap" in the y-axis direction. In these cases, inner flange 18 of track roller 14 cannot "drop down" between two adjacent inner roller surfaces 26. Although tracks featuring such continuous-contact designs may result in a smoother ride for the occupant of the vehicle, they may result in a significant reduction in the flexibility of track 10. For example, portions of track 10 may have limited curving ability before adjacent cores 12 contact one another, preventing track 10 from bending any further.

In contrast, track assemblies including adjacent cores 12 with a non-zero but minimal gap width between adjacent outer roller surfaces 22 and/or adjacent inner roller surfaces 26 may allow for greater track flexibility while maintaining a substantially smooth ride for the occupants of the attached vehicle.

Figure 4:
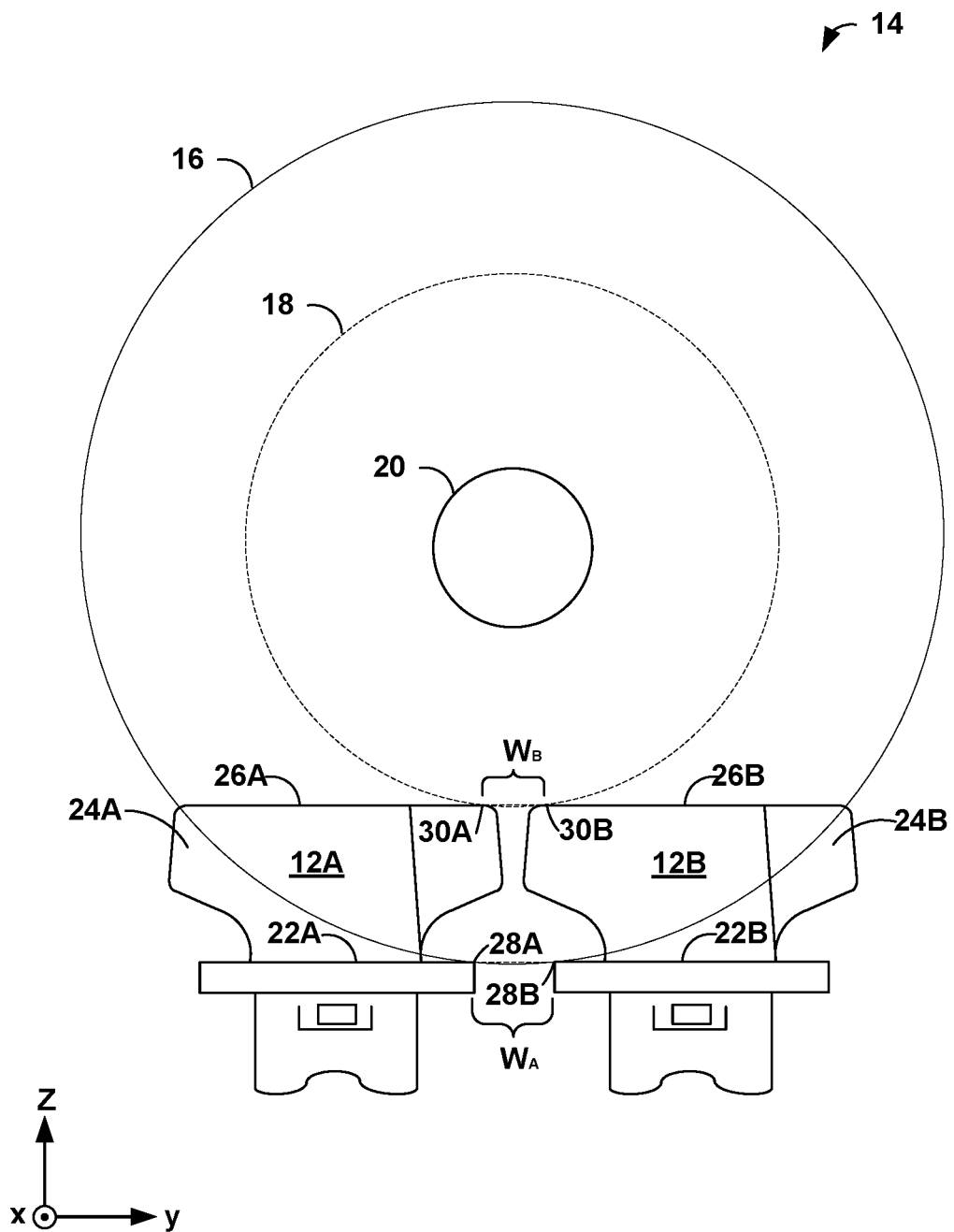
FIG. 4 is a side view of a track roller and a pair of cores for an endless track.

FIG. 4 is a side view of a pair of adjacent cores 12A and 12B of endless track 10 and track roller 14, and illustrates outer flanges 16, inner flange 18, and axle 20 of track roller 14 and outer roller surfaces 22A and 22B and protrusions 24A and 24B defining inner roller surfaces 26A and 26B of adjacent cores 12A and 12B. While specific cores 12A, 12B are referenced in the description of adjacent cores herein, in some examples, the description of cores 12A, 12B applies to any two adjacent cores of a plurality of cores 12 of endless track 10.

Plurality of cores 12 of endless track 10 are configured such that adjacent cores 12A and 12B may be spaced longitudinally apart (in the y-axis direction) so as to define a gap between the closest surfaces of cores 12A, 12B. For example, as shown in FIG. 4, the spacing between adjacent cores 12A and 12B defines a first width "$W_A$" between adjacent outer roller surfaces 22A and 22B, and a second width "$W_B$" between adjacent inner roller surfaces 26A and 26B. As widths "$W_A$" and "$W_B$" increase (i.e., selected to be relatively larger, by the manufacturer), a percentage of the diameter of flanges 16 and 18 that drops down into the gaps between adjacent cores 12A, 12B as track roller 14 rolls from one core 12A to the other 12B, similarly increases. This wider gap may result in a more flexible track, in that the track has more ability to curve or bend inwardly before any two adjacent cores physically contact one another. However, the up-and-down motion (in the z-axis) of track roller 14 dropping partially down in between adjacent cores 12 may cause uncomfortable jostling to the occupants of the vehicle suspended above track roller 14. However, if either or both of widths "$W_A$" and "$W_B$" are too narrow, then protrusion 24A may physically contact protrusion 24B when the portion of endless track 10 including cores 12A, 12B bends, which may prevent track body 38 (not shown in FIG. 4) from bending any further. This may result in a smoother ride for the occupants of the vehicle, as track roller 14 rolls along a single horizontal plane, but may also result in a substantially rigid track having a relatively large radius of curvature, accommodating only large drive sprocket wheels and track rollers.

In examples described herein, widths $W_A$ and $W_B$ are selected so as to balance a smoother ride (i.e., adjacent cores 12 closer together) with a more flexible track (i.e., adjacent cores 12 farther apart). For example, gaps $W_A$ and $W_B$ may be selected to be proportional to the diameters of the flanges 16, 18 of the track roller 14 rolling over the cores. For example, gaps $W_A$ and $W_B$ may be selected such that about 0.2% of the diameters of flanges 16, 18, fit downward (in the z-axis direction) between the respective gaps.

Figure 5:
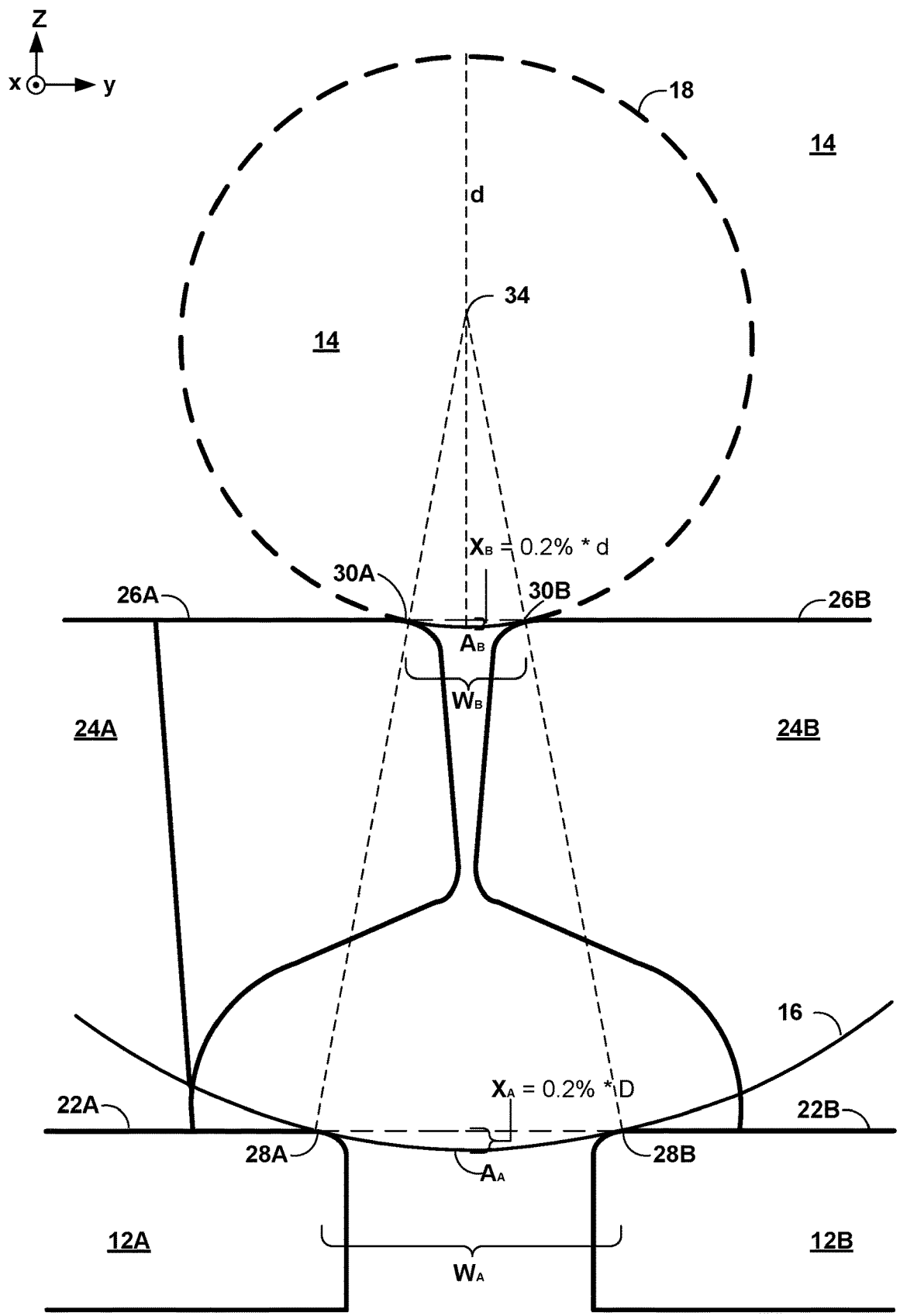
FIG. 5 is a side view of a track roller and a pair of cores for an endless track.

FIG. 5 is a side view of adjacent cores 12A and 12B of endless track 10 and a track roller 14. In particular, FIG. 5 illustrates parts of outer flange 16 and inner flange 18 of track roller 14 and outer roller surfaces 22A and 22B and protrusions 24A and 24B defining inner roller surfaces 26A and 26B of cores 12A and 12B, respectively. As described above, when outer flange 16 rolls along outer roller surfaces 22 (in the y-axis direction), outer flange 16 will partially drop into the gap "$W_A$" between the two adjacent outer roller surfaces 22A, 22B. At this point, outer flange 16 will contact both outer roller surface 22A at contact point 28A and outer roller surface 22B at contact point 28B. While this gap "$W_A$" enables track body 38 (shown in FIG. 1B) to flex, too large of a gap "$W_A$" may cause discomfort to the vehicle occupant when the track roller 14 drops from surface 22A down into gap $W_A$ and then rolls back up onto surface 22B.

In examples described herein, widths "$W_A$" and "$W_B$" are greater than zero. Width "$W_A$" and/or width "$W_B$" may be selected based on the size of outer flange 16 and/or inner flange 18 of track roller 14 intended to be used with endless track 10. For example, width "$W_A$" may be selected based on the desired amount of outer flange 16 that drops vertically (i.e., along the negative-z-axis direction) down into the gap when outer flange 16 contacts both cores 12A, 12B at the respective contact points 28A, 28B. In geometric terms, this amount (labeled as "$X_A$" in FIG. 5) is referred to as the "sagitta", or the maximum height of the portion of outer flange 16 that fits between contact points 28A and 28B. In some examples, the gap width $W_A$ may be selected such that the sagitta $X_A$ is approximately equal to 0.2% of the diameter "D" of outer flange 16. Selecting this amount "$X_A$" to be equal to 0.2%*D may balance the both the benefits of a flexible track (by having spaced cores) with the benefits of a relatively smooth ride for the occupants of an attached vehicle (by keeping the cores in relative proximity to one another), by establishing a near-continuous or net-continuous contact (NCC) between track roller 14 and the plurality of iron cores 12.

Similarly, when inner flange 18 rolls along inner roller surface 26A toward inner roller surface 26B (in the y-axis direction), inner flange 18 may partially drop vertically down (in the negative-z-axis direction) into the gap "$W_B$" between the adjacent inner roller surfaces 26A and 26B. At this point, inner flange 18 will contact both inner roller surface 26A at contact point 30A, and inner roller surface 26B at contact point 30B. While this gap "$W_B$" enables track 10 to bend, too large a gap "$W_B$" may cause discomfort to the vehicle occupant when inner flange 18 drops down into the gap between contact points 30A, 30B.

In some examples, width "$W_B$" is defined indirectly, by the amount of inner flange 18 that drops vertically down into the gap. In geometric terms, this amount (labeled as "$X_B$" in FIG. 5) is referred to as the "sagitta", or the maximum height of the portion of inner flange 18 that fits between contact points 30A and 30B. In some examples, the gap width $W_B$ may be selected such that the sagitta $X_B$ is approximately equal to 0.2% of the diameter "d" 34 of inner flange 18.

In some examples, both $W_A$ and $W_B$ may simultaneously be selected to follow a "0.2% rule," i.e., both $X_A$ is equal to 0.2% of D (36), and also $X_B$ is equal to 0.2% of d (34). However, because outer flanges 16 and inner flange 18 all share common axle 20, all three flanges 16, 18 must simultaneously rise up and drop down (in the z-axis direction) by the same distance. Although inner gap width $W_B$ may be selected such that 0.2% of d (34) fits in between contact points 30A and 30B, when track roller 14 rolls forward onto core 12B, both outer flanges 16 and inner flange 18 rise up (in the z-axis direction) by the same amount. Because outer flange diameter "D" (36) is larger than inner flange diameter "d" (34), both outer flanges 16 and inner flange 18 will rise up by the larger amount of 0.2% of D (36), causing inner flange 18 to slightly rise up above inner roller surfaces 26. Therefore, in some examples in which both $W_A$ and $W_B$ follow the 0.2% rule, inner flange 18 may hover slightly above inner roller surfaces 26 as track roller 14 rolls, rather than actually rolling across them.

Figure 6:
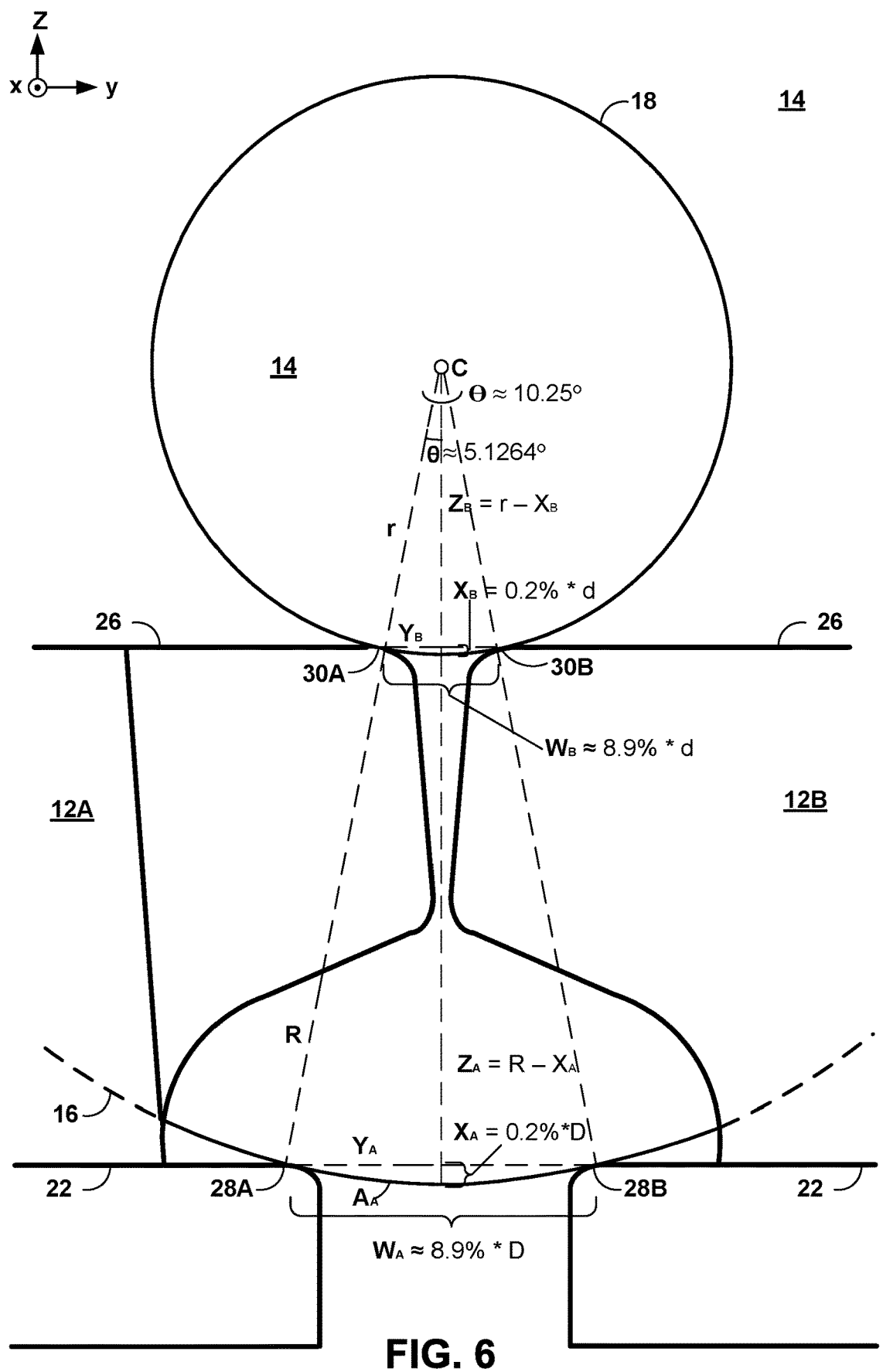
FIG. 6 is a side view of a track roller and a pair of cores for an endless track.

FIG. 6 is a side view of track roller 14 and a pair of adjacent cores 12A and 12B for an endless track. As described above, a gap width $W_A$ between outer roller surfaces 22A and 22B may be defined indirectly by the sagitta $X_A$—the height of the portion of outer flange 16 that drops below outer roller surfaces 22 when outer flange 16 is in physical contact with both core 12A and core 12B at contact points 28A and 28B, respectively. For example, one such gap width may be defined by a sagitta $X_A$ that is approximately equivalent to 0.2% of the diameter "D" of outer flange 16. Because the gap width $W_A$ and the sagitta $X_A$ are perpendicular to each other, a more direct expression of the gap width W may be obtained via trigonometric ratios:

D=Diameter of outer flange 16
R=Radius of outer flange 16
D=2*R (Definition of diameter and radius)
$X_A$=Sagitta (Height of flange 16 dropping down between cores)
$Z_A$=Height of flange radius not dropping down between cores
$W_A$=Width of gap between contact points 28
$Y_A$=½*$W_A$
$X_A$+$Z_A$=R (flange inside gap+flange radius above gap=total radius)
$X_A$=(0.2%)*D (Selected as example definition of an optimal sagitta)
$X_A$=(0.2/100)*(2*R)
$X_A$=0.004 R
$Z_A$=R−$X_A$
$Z_A$=R−0.004 R
$Z_A$=0.996 R
$Z_A^2$+$Y_A^2$=$R^2$ (Pythagorean Theorem)
$Y_A^2$=$R^2$−$Z_A^2$
$Y_A$=sqrt($R^2$−$Z_A^2$)
$Y_A$=sqrt[$R^2$−$(0.996R)^2$]
$Y_A$=sqrt[$(1-0.996^2)$*$R^2$]
$Y_A$=[sqrt(1−0.992016)]*R
$Y_A$=[sqrt(0.007984)]*R
$Y_A$=0.08935323*R
$W_A$=2*(0.08935*R)
$W_A$=0.1787*R
$W_A$=(17.87%)*R
$W_A$=(8.935%)*D Accordingly, an example gap width $W_A$ may be defined as approximately 8.9% of the diameter "D" of the outer flange 16. Using further trigonometric ratios, this example gap width $W_A$ may further be indirectly defined by the size of the pie-shaped wedge of outer flange 16 between contact points 28A, 28B and center C, having a central angle θ, and arc-length A:

θ=2*θ
sin(θ)=$Y_A$/R
sin(θ)=(0.08935*R)/R
sin(θ)=0.08935
θ=$\sin^{-1}$(0.08935)
θ=5.1264°
θ=2*5.1264°
θ=10.25°
360°=2π radians
$A_A$=10.25°*2πR/360°
$A_A$≈(π/17.56)*R Accordingly, an example gap width $W_A$ may define a wedge of outer flange 16 having a central angle "C" of about 10.25°, or an arc-length $A_A$ of approximately (π/17.56)*R.

Since all of these equations are functions of a variable radius, the same results apply proportionally to the inner gap width "$W_B$". In other words, an example gap width $W_B$ may be defined as approximately 8.9% of the diameter "d" of the inner flange 18. Further, an example gap width $W_B$ may define a wedge of inner flange 18 having a central angle "C" of about 10.25°, or an arc-length "$A_B$" (as shown in FIG. 5) of approximately (π/17.56)*r.

Various examples of the disclosure have been described. Any combination of the described systems, operations, or functions is contemplated. These and other examples are within the scope of the following claims.

What is claimed is:

1. A vehicle track comprising:
a track body;
a track roller configured to engage with an inner surface of the track body and roll relative to the inner surface; and
a plurality of cores at least partially embedded the track body, each core of the plurality comprising:
at least one roller surface configured to contact an outer flange of the track roller when the track roller is engaged with the inner surface of the track body; and
at least one protrusion that contacts an inner flange of the track roller when the track roller is engaged with the inner surface of the track body and the at least one roller surface of the respective core contacts the outer flange of the track roller,
wherein the track roller is configured to simultaneously contact a first core and an adjacent second core of the plurality of cores,
wherein a first axis extends between a first inner flange contact point on a first protrusion of the first core and a second inner flange contact point on a second protrusion of the second core,
wherein a second axis extends between a first outer flange contact point on a first rolling surface of the first core and a second outer flange contact point on a second rolling surface of the second core, and
wherein a distance between the first core and the second core is selected such that when a portion of the track body is substantially flat, at least one of:
about 0.2% of an inner flange diameter of the inner flange of the track roller extends perpendicular to the first axis and into a gap between the first and second cores, or
about 0.2% of an outer flange diameter of the outer diameter of the track roller extends perpendicular to the second axis extending and into the gap between the first and second cores.

2. The track of claim 1, wherein the distance between the first core and the second core is selected such that when the portion of the track body is substantially flat, about 0.2% of the inner flange diameter of the inner flange of the track roller extends perpendicular to the first axis and into the gap between the first and second cores, about 0.2% of the inner flange diameter being positioned on one side of the first axis and the remainder of the inner flange diameter being positioned on an opposite side of the first axis.

3. The track of claim 2, wherein the distance between the first inner flange contact point and the second inner flange contact point is about 8.9% of the inner flange diameter.

4. The track of claim 1, wherein the distance between the first core and the second core is selected such that when the portion of the track body is substantially flat, about 0.2% of the outer flange diameter of the outer diameter of the track roller extends perpendicular to the second axis and into the gap between the first and second cores, about 0.2% of the outer flange diameter being positioned on one side of the second axis and the remainder of the inner flange diameter being positioned on an opposite side of the second axis.

5. The track of claim 4, wherein the distance between the first outer flange contact point and the second outer flange contact point is about 8.9% of the outer flange diameter.

6. The track of claim 1, wherein the distance between the first core and the second core is selected such that when the portion of the track body is substantially flat:
- about 0.2% of the inner flange diameter of the inner flange of the track roller extends perpendicular to the first axis and into the gap between the first and second cores, and
- about 0.2% of the outer flange diameter of the outer diameter of the track roller extends perpendicular to the second axis and into the gap between the first and second cores.

7. The track of claim 1, wherein the at least one roller surface comprises two roller surfaces, and wherein each track roller further comprises two outer flanges, each roller surface being contacting a respective outer flange of the two outer flanges of the track roller when the track roller is engaged with the inner surface of the track body.

8. The track of claim 1, wherein the at least one protrusion comprises two protrusions, wherein each of the two protrusions contacts the inner flange of the track roller when the track roller is engaged with the inner surface of the track body.

9. The track of claim 1, wherein the at least one protrusion has a substantially Z-shaped surface area.

10. The track of claim 1, wherein an angle between the first inner flange contact point, a central axis of the track roller, and the second inner flange point is about 10.25°.

11. The track of claim 1, wherein an angle between the first outer flange contact point, a central axis of the track roller, and the second outer flange contact point is about 10.25°.

12. The track of claim 1, wherein the cores comprise metal and the track body comprises an elastomer.

13. The track of claim 1, further comprising the track roller.

14. A tracked vehicle comprising:
- a track roller; and
- an endless track comprising a plurality of metal cores, each metal core of the plurality comprising:
  - a base segment comprising at least one outer flange contact surface configured to contact an outer flange of the track roller when the track roller is engaged with the endless track, wherein the outer flange defines an outer flange diameter; and
  - at least one protrusion extending from the base segment, the at least one protrusion comprising an inner flange contact surface that contacts an inner flange of the track roller when the track roller is engaged with the endless track and the at least one outer flange contact surface of the respective metal core contacts the outer flange of the track roller, wherein the inner flange defines an inner flange diameter, wherein the plurality of metal cores are substantially evenly spaced along the inner surface of the endless track such that when a respective portion of the endless track is substantially flat, a first metal core of the plurality adjacent to a second metal core of the plurality within the respective portion defines at least one of the following:
    - a first separation distance between a first inner flange contact surface of the first metal core and a second inner flange contact surface of the second metal core, wherein the first separation distance is configured so that when the inner flange of the track roller simultaneously contacts the first and the second inner flange contact surfaces, about 0.2% of the inner flange diameter will extend past an axis connecting a first contact point where the inner flange contacts the first inner flange contact surface and a second contact point where the inner flange contacts the second inner flange contact surface; or
    - a second separation distance between a first outer flange contact surface of the first metal core and a second outer flange contact surface of the second metal core, wherein the second separation distance is configured so that when the outer flange of the track roller simultaneously contacts the first and the second outer flange contact surfaces, about 0.2% of the outer flange diameter will extend past an axis connecting a third contact point where the outer flange contacts the first outer flange contact surface and a fourth contact point where the outer flange contacts the second outer flange contact surface.

15. The vehicle of claim 14, wherein the at least one protrusion comprises two protrusions, wherein each of the two protrusions comprises an inner flange contact surface that contacts the inner flange of the track roller when the track roller is engaged with the endless track.

16. The vehicle of claim 14, wherein the inner flange contact surface of the at least one protrusion has a substantially Z-shaped surface area.

17. The vehicle of claim 14, wherein the first separation distance is about 8.9% of the inner flange diameter.

18. The vehicle of claim 14, wherein the second separation distance is about 8.9% of the outer flange diameter.

19. The vehicle of claim 14, wherein a first angle between the first contact point, a center of the inner flange, and the second contact point is about 10.25°.

20. The vehicle of claim 14, wherein a second angle between the third contact point, a center of the inner flange, and the fourth contact point is about 10.25°.

* * * * *